United States Patent
Dziak et al.

(10) Patent No.: US 9,026,891 B2
(45) Date of Patent: May 5, 2015

(54) METHOD FOR FORMAT SAVINGS IN COHERENTLY WRITTEN FRAGMENTED SECTORS

(71) Applicant: LSI Corporation, San Jose, CA (US)

(72) Inventors: Scott M. Dziak, Fort Collins, CO (US); Jeffrey P. Grundvig, Loveland, CO (US); Jason D. Byrne, Lyons, CO (US)

(73) Assignee: LSI Corporation, San Jose, CA (US)

( * ) Notice: Subject to any disclaimer, the term of this patent is extended or adjusted under 35 U.S.C. 154(b) by 162 days.

(21) Appl. No.: 13/831,246

(22) Filed: Mar. 14, 2013

(65) Prior Publication Data

US 2014/0281818 A1 Sep. 18, 2014

Related U.S. Application Data

(60) Provisional application No. 61/780,163, filed on Mar. 13, 2013.

(51) Int. Cl.
| | |
|---|---|
| *G11C 29/00* | (2006.01) |
| *G11B 27/30* | (2006.01) |
| *G11B 20/12* | (2006.01) |
| *G06F 11/10* | (2006.01) |
| *G11B 20/10* | (2006.01) |

(52) U.S. Cl.
CPC ........ *G11B 27/3027* (2013.01); *G06F 11/1076* (2013.01); *G11B 20/1217* (2013.01); *G11B 2020/10916* (2013.01); *G11B 2020/1232* (2013.01)

(58) Field of Classification Search
CPC ............ G06F 11/1076; G06F 11/1008; G06F 2211/1057; G11B 20/1833; H05K 999/99
USPC ......................................................... 714/770
See application file for complete search history.

(56) References Cited

U.S. PATENT DOCUMENTS

| | | | | |
|---|---|---|---|---|
| 5,499,253 | A | * | 3/1996 | Lary ............................ 714/770 |
| 2011/0078496 | A1 | * | 3/2011 | Jeddeloh ...................... 714/6.24 |
| 2014/0071887 | A1 | * | 3/2014 | Tian et al. .................... 370/328 |

* cited by examiner

*Primary Examiner* — Albert Decady
*Assistant Examiner* — Enam Ahmed
(74) *Attorney, Agent, or Firm* — Suiter Swantz pc llo (57) ABSTRACT

A method and system for performing a shortened acquire cycle for at least one fragment of at least one data sector having coherently written fragments, the coherently written fragments being written during a single rotation of a storage medium. The method includes performing a full acquire cycle for a first fragment of a particular data sector of the at least one data sector. The method further includes reusing at least a portion of the acquisition information of the first fragment to perform a shortened acquire cycle for at least one subsequent coherently written fragment. The method also includes reusing at least a portion of the acquisition information of the first fragment to perform a shortened acquire cycle for at least one subsequent coherently written fragment. Additionally, the method includes performing the shortened acquire cycle for the at least one subsequent coherently written fragment.

27 Claims, 8 Drawing Sheets

METHOD FOR FORMAT SAVINGS IN COHERENTLY WRITTEN FRAGMENTED SECTORS

CROSS-REFERENCE TO RELATED APPLICATIONS

This application claims the benefit of U.S. Provisional Application No. 61/780,163, filed on Mar. 13, 2013.

FIELD OF THE INVENTION

Embodiments of the invention are directed generally toward a method, circuit, apparatus, and system for providing format savings in coherently written fragmented sectors.

BACKGROUND

Often, data sectors on hard disk drives are split into two fragments. Currently, the two fragments are read by performing a full acquisition cycle over each of the two fragments. Performing a full acquisition cycle for the two fragments requires that each fragment includes a full-length preamble. The formatting associated with each full-length preamble consumes a significant portion of a hard disk drive's capacity. Therefore, it would be desirable to provide a method, system, and apparatus configured to reduce the required preamble length for one or more fragments of each split data sector.

SUMMARY

Accordingly, an embodiment includes a method for performing a shortened acquire cycle for at least one fragment of a data sector having coherently written fragments. The method includes performing a full acquire cycle for a first fragment of the data sector. The method further includes recording acquisition information of the first fragment obtained from performing the full acquire cycle for the first fragment of the data sector. The method also includes reusing at least a portion of the acquisition information of the first fragment to perform a shortened acquire cycle for at least one subsequent fragment of the data sector. Additionally, the method includes performing the shortened acquire cycle for the at least one subsequent fragment of the data sector.

Additional embodiments are described in the application including the claims. It is to be understood that both the foregoing general description and the following detailed description are exemplary and explanatory only and are not restrictive. Other embodiments of the invention will become apparent.

BRIEF DESCRIPTION OF THE FIGURES

Other embodiments of the invention will become apparent by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications, and equivalents are encompassed. For the purpose of clarity, technical material that is known in the technical fields related to the embodiments has not been described in detail to avoid unnecessarily obscuring the description.

Embodiments of the invention include a method, apparatus, software or firmware, service, and/or system for reducing the formatting overhead of reading, writing, and/or recovering errors in non-volatile computer-readable media (e.g., non-transitory computer-readable/writable media, such as a hard-disk drive, or the like).

When fragmented data sectors are written coherently to a hard disk drive, any difference in phase alignment of separate fragments is primarily due to synthesizer drift. When fragments are written close together in time, the drift is small; whereas, when fragments are written further apart, the drift is large. As such, embodied methods allow for handling any two fragments written close together in time (e.g., in a same medium (such as a disk) rotation). In embodiments of the invention, upon sector read-back, initial gross phase acquisition and sync mark alignment information for all fragments of a data sector are obtained solely from the first fragment. That is, the initial gross phase acquisition and/or sync mark alignment information of the first fragment of a plurality of data fragments of a data sector is approximately the same or remains approximately the same for the second and any other subsequent fragments. Embodiments of the invention provide means, instructions, and methods for reusing the initial gross phase acquisition and/or sync mark alignment information so as to reduce system and process overhead during processing related to the second and subsequent fragments of the data sector. That is, by reusing the initial gross phase acquisition and sync mark alignment information determined from the first fragment and by applying this information to a second or subsequent fragments as indicated by a formatter, the preamble acquisition in second or subsequent fragments of the data sector is significantly reduced or eliminated. Embodiments of the invention include applying varying levels of acquisition to subsequent fragments, which allows for tradeoffs in synthesizer drift versus preamble overhead. Embodiments of the invention also include data recovery methods for resolving repeatable errors in acquisition phase difference between sector fragments.

When a user or process writes a fragmented sector, most often, the writes are coherent (i.e., the fragments are written during the same disk revolution with only one or more servo events intervening or occurring during the disk revolution), and most often the write phase alignment of the fragments does not change significantly between writes. When fragments are written coherently, the change in read-back phase of the fragments will tend to be very small. Because of this, a digital phase-locked loop (DPLL) of a control system will not need to make large changes to the sampling phase to acquire the preamble signal; for example, in some embodiments, when fragments are written coherently the DPLL of the control system will not need to slew the phase mixer by a significant amount. (Upon solving for the phase difference, slewing includes changing the sampling phase at a rate of a fraction of the full-rate read temporal frequency (e.g., a rate of approximately 1/64th T per full-rate read T, where T=1/(data rate)) until the correct sampling phase is reached.)

Embodiments of the disclosure include allowing the user or process to specify over a system data interface on a per fragment basis if a full gross phase acquisition and reacquire cycle (e.g., a zero phase start (ZPS)/acquire cycle) is required. As such, embodiments of the invention take advantage of a format upside as result of not having to perform a large (e.g., full) initial phase acquisition.

Embodiments of the invention include a user or process enabling a full gross phase acquisition and reacquire cycle (e.g., a full zero phase start (ZPS)/acquire cycle) for the first fragment of every sector. For subsequent fragments, embodiments further include the user or process enabling a reduced preamble mode (e.g., wherein the reduced preamble mode can be implemented with a short 2T period (where "T" is a temporal frequency (i.e., the inverse of a frequency))) if the subsequent fragments are separated by no more than one servo event from the last coherently written fragment.

In some embodiments, the user or process specifies that a full preamble period is required for a particular read event associated with one or more subsequent fragments such that the digital phase-locked loop (DPLL) operates with a full gross phase acquisition and reacquire cycle (e.g., a full ZPS/acquire cycle) regardless of how many servo events separate the subsequent fragments from the last coherently written fragment.

In embodiments where the user or process has enabled or set a reduced preamble period for the read event of one or more subsequent fragments of the sector, the DPLL shortens the required (and actual) length of each preamble associated with each of the subsequent fragments by altering (e.g., reducing) gross phase acquisition and associated timing.

Embodiments of the disclosure include using initial gross acquisition information from a first read fragment to acquire information which can be used to reduce necessary overhead for reading subsequent fragments of a sector.

Additionally, embodiments include allowing a user (such as a customer, programmer, technician, or end-user) or process to specify on a per-fragment basis whether or which fragments require full acquisition sequences. In some embodiments, an automated process, circuit, firmware, software, or controller controls whether and under what conditions to perform full acquisition sequences or shortened acquisition sequences. Furthermore, some embodiments include operating modes configured to perform shortened acquisition sequences when moderate and slight phase drift occurs between an initial fragment and subsequent fragments of a sector. Embodiments of the invention also include performing data recovery or debugging when larger repeatable phase offsets occur between fragments of a sector.

Figure 1:
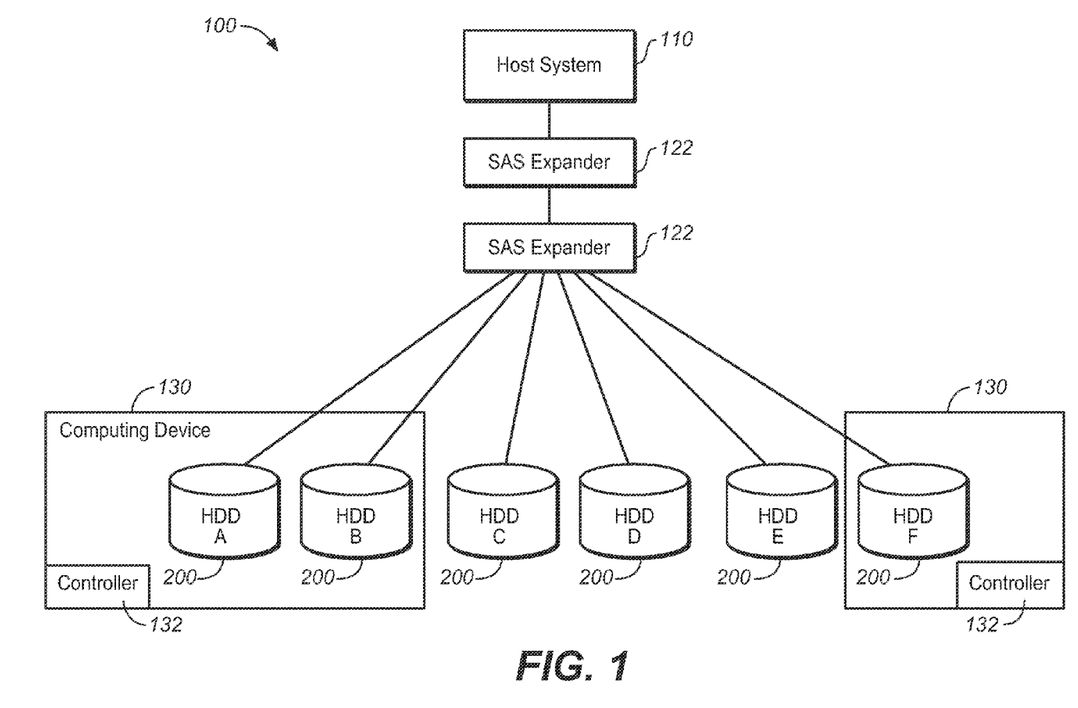
FIG. 1 shows an exemplary communicatively coupled system topology.

Referring to FIG. 1, an exemplary communicatively coupled system topology 100 including a host system 110, a plurality of expanders 122 (such as Serial Attached Small Computer System Interface (SAS) expanders, or the like), a plurality of computing devices 130, and a plurality of hard disk drives (HDDs) 200 (in various configurations and arrangements) is depicted. For example, each computing device 130 can include one or more controllers 132 (such as a storage controller, or the like) and one or more hard disk drives 200, as well as any other computer components (not shown), such as one or more processors, one or more network cards, one or more busses, one more memories, software, firmware, a power supply, other storage components (such as solid state drives), wired or wireless connectivity to other devices, or the like.

Figure 2:
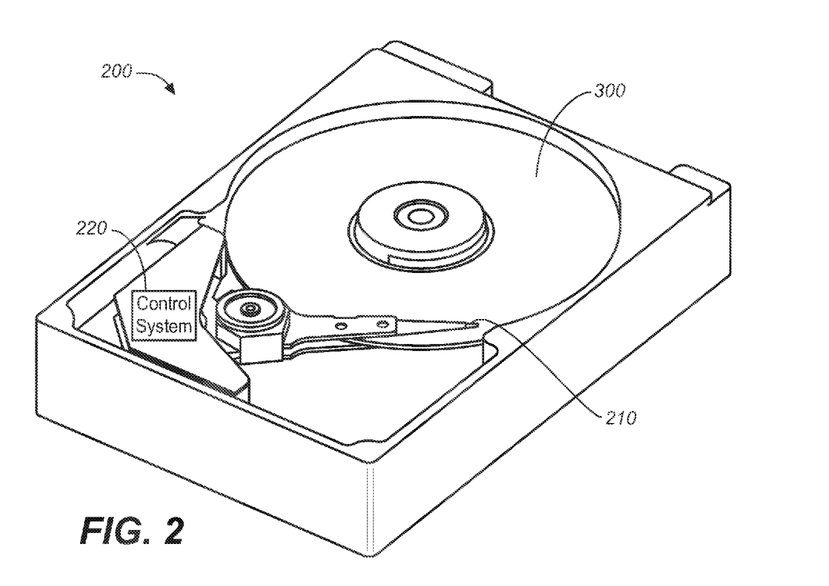
FIG. 2 shows an exemplary storage device.

Referring to FIG. 2, an exemplary hard disk drive 200 suitable for embodiments of the invention is depicted. The hard disk drive 200 includes one or more platters 300, one or more read/write heads 210, and a control system 220, as well as other components known to one of ordinary skill in the art. Each of the one or more read/write heads 210 includes one or more magnetic heads configured to read and write raw data streams to a particular platter 300 of the hard disk drive 200. In embodiments of the invention, the control system 220 includes an electronic circuit. The electronic circuit can comprise a phase-locked loop circuit (such as a digital phase-locked loop or an all-digital phase-locked loop).

Figure 3:
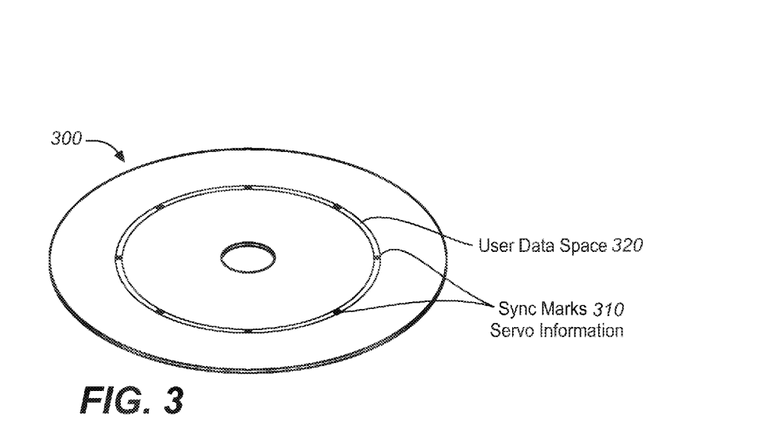
FIG. 3 shows an exemplary platter of a hard disk drive.

Referring to FIG. 3, an exemplary platter 300 of a hard disk drive 200 is depicted. The platter 300 includes a plurality of user data spaces 320 and a plurality of sync marks 310. Each of the plurality of sync marks 310 provides servo information configured to be read by a read/write head 210. This servo information is used by the control system 220 for the synchronization and timing of read/write events.

Figure 4:
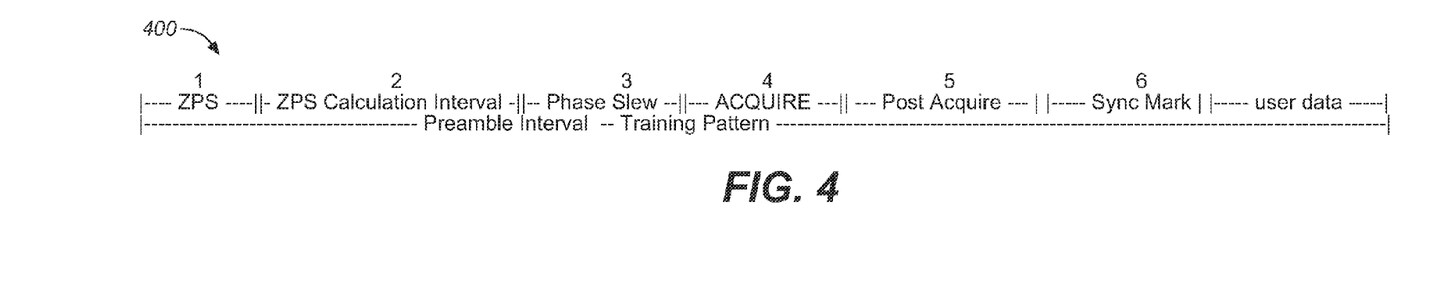
FIG. 4 shows an interval diagram of a fragment of a data sector.

Referring to FIG. 4, an interval diagram of a fragment 400 of a data sector showing a preamble and user data is depicted. The preamble 400 includes a plurality of training pattern intervals. In some embodiments of the invention, each fragment of the data sector includes or is formatted as one or more of six intervals and user data. For example, a fragment including a full ZPS/acquisition cycle preamble includes six intervals and user data. During a first interval, the read channel accumulates an incoming signal. During a second interval, the read channel measures phase of the incoming signal. During a third interval, the read channel aligns a system clock to that of the incoming signal; the length of time required to complete the third interval is a function of the difference of the system clock phase and the phase of the incoming signal. During a fourth interval, the read channel makes fine adjustments to the system clock to align the incoming signal. It should be noted that the fourth interval may overlap with the third interval. During the fifth interval, the system continues making fine adjustments to the system clock and for one or more sync marks. During the sixth interval, the read channel acquires the sync mark information. User data follows the one or more of six intervals included in the fragment.

Figure 5:
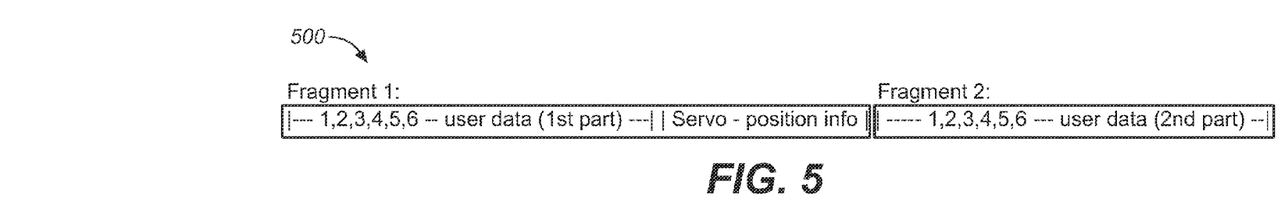
FIG. 5 shows a first fragment and a second fragment of a read/write sequence.

FIG. 5 depicts a first fragment and a second fragment of a read/write sequence 500 for a data sector having two fragments. Both of the first fragment and the second fragment include regions 1, 2, 3, 4, 5, and 6 (which correspond to the first interval through sixth interval, respectively, as depicted in FIG. 4). However, when the first fragment and the second fragment are written at (or approximately at) the same time, the phase of the data in the first fragment and the second fragment is very close to the same. During the readback, the second fragment is read right after the first fragment, and the third interval is very small because the clock was just aligned in the first fragment. Because of this, the fourth interval and the fifth interval can overlap the first interval, the second interval, and the third interval. Therefore, the user or process is enabled to reduce the size of the preamble, which saves space on the disk. For example, a preamble which normally includes the first through fifth intervals can be reduced to include the fourth interval and the fifth interval.

At the system level, if effects of bit error and sector failure rate are neglected, the minimum size of the preamble length is generally dictated by 1) a DPLL phase slew limitation via gross phase acquisition and reacquire cycle (e.g., via zero phase start/phase rotation) and 2) an acquire timing limitation. (Phase rotation includes a synthesizer phase alignment via incremental change to the sampling phase and is generally subject to a maximum rate of sampling phase change.)

The minimum size of the preamble length is partially limited by a DPLL phase slew limitation via gross phase acquisition and re-acquire cycle (e.g., via zero phase start/phase rotation). When a read event starts, the DPLL initiates a gross phase acquisition and re-acquire cycle (e.g., a zero phase start). The zero phase start, for example, includes integrating 8, 16, or 32 samples, and a discrete Fourier transformation (DFT) is computed at the temporal frequency of the preamble (e.g., a fundamental frequency of $\frac{1}{4}^{th}$ of the read sampling rate). Based upon the DFT computation, the digital phase-locked loop solves for the phase difference between the current sampling phase and the desired sampling phase. After solving for the phase difference, the DPLL slews the sampling phase at a particular rate until the correct sampling phase is reached. For example, in some implementations, after solving for the phase difference, the DPLL slews the sampling phase at a rate of approximately $\frac{1}{64}^{th}$ of the read sampling rate until the correct sampling phase is reached; however, it is fully contemplated that the DPLL may slew the sampling phase at any suitable rate (whether fixed, constant, variable, accelerating, decelerating, or the like) until the correct sampling phase is reached. Furthermore, embodiments of the invention include completing this process before sampling the sync mark.

Because most of the second and subsequent fragments of split data sectors are written coherently, any computed phase difference will be small such that little or no phase slew is required.

In addition to solving for the sample phase difference, the zero phase start process solves for the quadrant (upon which $\frac{1}{4}^{th}$ rate sample lane of the positive peak of the preamble on the output of a filter resides) and the expected sync mark position via the digital phase-locked loop sync mark signal. In current read channel generation, write events are restricted to 4T alignment, and because of the 4T alignment, phase quadrant does not vary between coherently written read fragments. It is contemplated that embodiments of the invention will apply to future read channel generations, which may include sub-4T write alignment.

Secondly, the minimum size of the read fragment preamble length is partially limited by acquire timing. The sync mark detection circuit uses the falling edge of the acquire period to begin searching for the sync mark. The acquire period starts after the gross phase acquisition computation (e.g., ZPS computation) has finished and is normally set to cover the majority of the preamble.

Embodiments of the invention include adding and operating in additional modes to alter the acquire timing and to change the loop adaptation behavior with the modified acquire timing. Embodiments of the invention further include adding and operating in additional debug and data recovery modes. Some embodiments include indicating to the user (or other process) a value of the calculated slew amount (e.g., a calculated ZPS phase amount), if the value of the calculated slew amount is greater than a threshold value; this allows the user (or other process) to use the value of the calculated slew amount for performing additional operations, such as determining whether to perform in a particular mode (such as determining whether to operate in a recovery mode) or performing one or more operations of a particular mode (such as performing operations of a recovery mode). Additionally, embodiments of the invention include enabling, disabling, and/or switching between one or more embodied modes upon an instruction from a user, an instruction from a process, an instruction by a controller, an instruction by a mechanism, a trigger by a mechanism, a trigger by a controller, an automated process determination, or the like. Furthermore, some embodiments of the invention include operating in a single embodied mode at a particular time, no embodied modes at a particular time, multiple embodied modes at the same time, or the like.

In some embodiments, when the user (or process) initiates a read event (of a fragment), the user (or process) indicates in the read command whether to use the full acquire length or the short acquire length, which can be contained in a full acquire length register and a short acquire length register, respectively. In some embodiments, the indicating whether to use the full acquire length or the short acquire length is implemented by indicating whether to operate in a particular mode.

Embodiments of the invention include operating in a default mode. In the default mode, the DPLL handles all fragments as having a full preamble length, which is the default method of handling fragments. In some embodiments, operating in the default mode includes handling all fragments as having a full preamble length regardless of any value of signal configured to indicate an ability to use a reduced preamble for a particular fragment.

Embodiments of the invention include operating in a first acquire mode. The first acquire mode includes handling a second (or subsequent) coherently written fragment as a "normal" event regarding ZPS and slew, but shortening the acquire duration. In some embodiments, the first acquire mode is (or may be) enabled upon the determination or detection of a signal, which indicates that a reduced preamble acquire period can be used on a particular fragment. When the first acquire mode is enabled, the DPLL reduces the acquire bottleneck by using a reduced preamble register, which specifies the acquire length for reduced preamble fragments, to determine an acquire length for a particular fragment having a reduced preamble period. For example, in some embodiments, the end user or end process specifies a short acquire length, wherein the specified short acquire length is contained in a register. For the first acquire mode, the acquire interval for the reduced preamble period starts at the same time as compared to when a read fragment with full preamble period specified would start; however, the duration of the acquire interval for the reduced preamble fragment is based upon a short acquire length. For example, the duration of the short acquire interval can be 4 bits+8*[a specified acquire length of the short acquire register for the reduced preamble acquire preamble bits]. Except for the shortened acquire length, the first acquire mode handles fragments exactly as the default mode which handles fragments as having full preamble periods. That is, after the ZPS computation, the digital phase-locked loop slews the phase and starts the adaptation as normal. Embodiments, which include operating in the first acquire mode, include gross gain acquisition (or zero gain start) beginning (and/or occurring during) at the same time as and on the same samples as the ZPS sample.

Embodiments of the invention also include operating in a second acquire mode. Operating in the second acquire mode includes beginning acquire as soon as the filter pipeline is full. This mode also includes starting adaptation by using the phase quadrant information obtained from the previous preamble period. Embodiments of this second mode further include computing a gross phase acquisition (e.g., a trial zero phase start (ZPS)). For example, performing the trial ZPS includes solving for quadrant and sync mark location information. The mode includes applying phase quadrant information from the trial ZPS to the preamble adaptation as soon as the phase quadrant information is available. Adaptation continues until the computed trial ZPS quadrant information is valid. When the second acquire mode is enabled, phase slew is disabled for fragments which have been specified to have a reduced preamble period (such as by a signal configured to indicate that a reduced preamble acquire period can be used on a particular fragment). When operating in the second acquire mode, the acquire interval begins at a different time than when operating in the first acquire mode. For example, in some implementations operating in the second acquire mode, the acquire interval begins at a time corresponding to [12+4*[read start length]] bits into the preamble as soon as or upon the occurrence of analog to digital converter samples becoming valid; the length of the acquire interval for the reduced preamble fragment is based upon a short acquire length, which can be contained in a short acquire register. For example, the duration of the acquire interval can be 4 bits+ 8*[a specified acquire length of the short acquire register for the reduced preamble acquire preamble bits]. In some embodiments, zero gain start is disabled in a digital variable gain amplifier (DVGA) when operating in the second acquire mode and when a reduced preamble interval has been indicated for the current fragment. Embodiments, which include operating in the second acquire mode, include simultaneously or concurrently performing (or beginning the performance of) a ZPS sample calculation and performing (or beginning the performance of) start acquire (e.g., making small adjustments to the synthesizer loop). Furthermore, in some embodiments which include operating in the second acquire mode, the zero gain start is calculated at the same time as zero phase start, and this may be enabled or disabled in some implementations.

Embodiments of the invention include operating in a third acquire mode. The third acquire mode includes beginning a speculative acquire period as soon as the filter is full. During the speculative acquire period, the embodied mode includes speculatively computing phase and gain adjustments while computing a trial ZPS in parallel. Embodiments of the third acquire mode include determining whether the computed trial ZPS is greater than a threshold, and if the ZPS is greater than the threshold, the mode includes slewing the phase. If the computed trial ZPS is less than or equal to the threshold, the mode includes applying the results of the speculative phase and gain computations.

Embodiments of the invention include, for each fragment, a read/write interface block indicating via a signal to the DPLL if the fragment is to be read using a reduced preamble period. A control block samples the signal one cycle after the read event occurs.

Embodiments of the invention include a method for performing a shortened acquire cycle for at least one fragment of at least one data sector having coherently written fragments, the coherently written fragments being written during a single rotation of a storage medium. In some embodiments, shortened acquire cycles can be performed on any number of fragments on any number of sectors when the fragments of particular data sectors are coherently written. For example, a particular implementation of embodiments includes performing a first full acquire cycle for a first fragment of a first data sector, performing a second shortened acquire cycle for a second coherently written fragment of the first data sector, and performing a third shortened acquire cycle for a coherently written fragment of a second data sector.

Additionally, in some embodiments, after the full acquire cycle, subsequent coherent fragments do not have preambles. In such embodiments, the read channel can immediately begin detecting a sync mark for each of the at least one subsequent coherently written fragments.

In addition to the acquire modes, embodiments of the invention include operating in debug or data recovery modes.

Embodiments of the invention include operating in a first debug or data recovery mode for reporting ZPS phase on a per fragment basis. The first debug or data recovery mode includes determining whether a ZPS computation of a particular coherent fragment exceeds a programmable threshold. If the ZPS computation of the particular coherent fragment exceeds the programmable threshold, a flag is set and/or a channel fault is signaled. The flag and/or channel fault indicates that a fault has occurred. Embodiments of the invention include recording the phase and quadrant information on a per fragment basis for debugging and/or data recovery purposes; the information may be recorded on a per fragment basis regardless of whether the digital phase-locked loop is operating in one of the reduced preamble acquire modes or the default full preamble acquire mode. The fragment number for the particular or current fragment is indicated via a fragment-number value (e.g., either a 1 or 2 for a data sector split into two fragments; or 1, 2, 3, or 4 for a data sector split into four fragments) input to the control block. Embodiments include recording the computed ZPS value for each fragment in a ZPS register. Here, a ZPS value is an initial phase error, wherein the ZPS value indicates an amount of synthesizer drift between fragments. For example, the ZPS register may store the computed ZPS value for the last eight fragments; however, it is fully contemplated that the register for storing computed ZPS values on a per fragment basis can be configured or set to store computed ZPS values for any number of fragments, such as 2, 3, 4, 5, 6, 7, 8, 9, 16, 17, 32, 64, or the like. Additionally, in some embodiments, computed ZPS values for first fragments of data sectors may be stored in a separate ZPS register for first fragments of data sectors, and computed ZPS values for second (and subsequent) fragments may be stored in a separate ZPS register for second (and subsequent) fragments of data sectors.

Embodiments of the invention include operating in a second debug or data recovery mode for error reporting. The second debug or data recovery mode includes saving ZPS phase and quadrant calculations on a per fragment basis. For example, in some embodiments of the invention, the second debug or data recovery mode includes saving ZPS phase and quadrant calculations for eight fragments. Embodiments of the invention include error reporting. When the digital phase-locked loop is not operating in the default full preamble acquire mode (such as when the DPLL is running in one of the reduced preamble acquire modes or a debugging mode), some embodiments of the invention include setting a flag or enabling a channel fault indicator to indicate that a computed ZPS phase exceeds a threshold phase value. Additionally, some embodiments include setting the flag or enabling the channel fault indicator upon a determination that current quadrant information does not match quadrant information of a previous or immediately previous fragment. For example, if the computed value of the ZPS phase exceeds a threshold specified in a ZPS threshold register or if quadrant information indicates a shift greater than one-half of the length of a full preamble (e.g., 1T), a ZPS-over-threshold-fault flag may be set and/or routed to a fault channel.

Furthermore, embodiments of the invention include operating in a third debug or data recovery mode configured for altering the sampling phase by a configurable amount starting at the end of a given fragment. The third debug or data recovery mode includes altering the sampling phase by a predetermined, predicted, measured, calculated, or variable amount at the end of a fragment to initialize the phase for the next fragment. Some embodiments include allowing a user or process to instruct altering the sampling phase by a configurable amount on a per fragment basis where there is a repeatable phase offset between two fragments. For example, if an end-of-fragment sampling phase adjustment value is non-zero, whereby the end-of-fragment sampling phase adjustment value indicates an amount to alter the sampling phase at the end of fragment, the DPLL alters the sampling phase by an amount corresponding to the value indicated by the end-of-fragment sampling phase adjustment value in anticipation of the next fragment.

Embodiments of the invention increase the capacities of the read channel by reducing the required preamble length. The reduced preamble length provides system level improved formatting efficiencies as well as improvements to equivalent signal-to-noise ratio (SNR) results. Additionally, embodiments of the invention are configured to be adapted to future revisions of the read channel which may include further reductions to preamble length.

Reduction of the size of the preamble field of fragments results in format savings. For example, currently, preambles have minimum specification length of 104 bits with a real calculated minimum length of 92 bits; at 104 bits the preamble uses approximately 0.50% of a drive formatted for 4K (kilobyte) sectors (and uses 2.4% of a drive formatted for 512 byte sectors). (N.b., these calculations are based upon assumptions of 7% servo and gaps with conservative estimates of 70% of the 4K sectors being split into fragments and 10% of the 512 byte sectors being split.) For demonstrative purposes removing the preamble completely yields an effective 0.06 dB (decibel) of SNR gain because of the format savings for 4K sector formatting (0.28 dB of SNR gain for 512 byte sector formatting). Likewise, for every 16 bits of preamble length reduction, there is an effective 0.01 dB SNR gain for 4K sector formatting (0.04 dB of SNR gain for 512 byte sector formatting).

Figure 6:
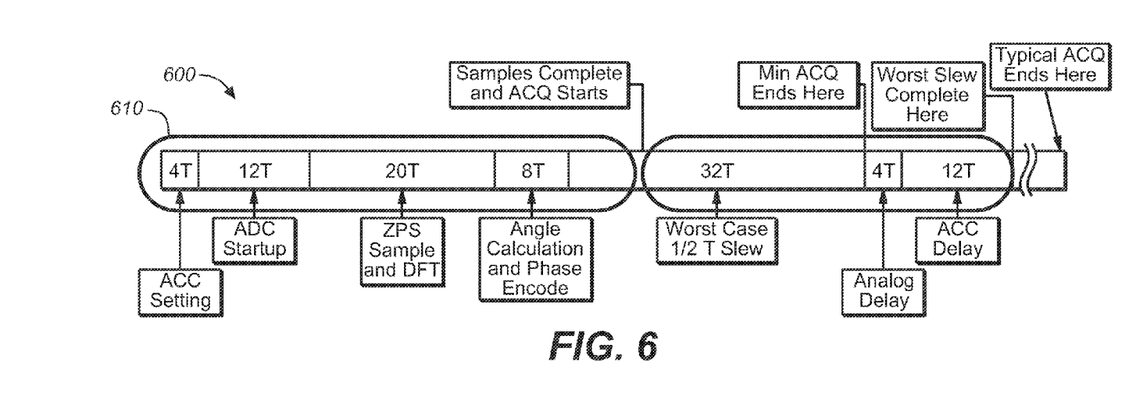
FIG. 6 shows a currently implemented preamble.

Referring to FIG. 6, a currently implemented preamble 600 is depicted. The preamble 600 of FIG. 6 demonstrates how the preamble 600 is currently consumed. The currently implemented preamble 600 requires a total length of 92 bits to complete all phases of ZPS (with the worst-case slews on the analog-to-digital converter (ADC) output before the sync mark; this time varies, depending especially on phase slew settling and also on assumptions made regarding frequency offset, analog delay, etc. Typically, acquire interval (ACQ) lengths form the majority of the preamble length. As exemplarily depicted in FIG. 6, a region 610 of the currently implemented preamble includes: AC-coupling (ACC) settling with a length of 4 bits; analog-to-digital converter (ADC) startup with a length of 12 bits; zero phase start (ZPS) sampling and discrete Fourier transformation (DFT) calculations with a length of 20 bits; angle calculation and phase encode with a length of 8 bits; and in some cases a portion of slew adjustment. Additionally, the 92 bit preamble 600 includes worst-case slew (for ½ T maximum phase error, where T=1/(data rate), which can also be described as ½ bit period maximum phase error or ½ sampling clock cycle maximum phase error) with a length of up to 32 bits; analog delay with a length of 4 bits; and ADC delay with a length of 12 bits. Embodiments of the invention include reducing the length of the preamble corresponding to events during the region 610 of the currently implemented preamble 600.

Figure 7:
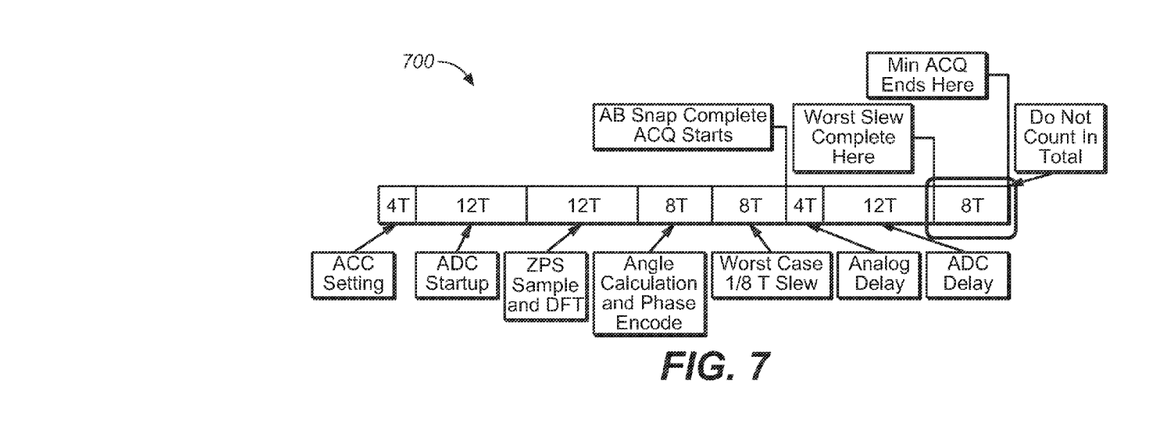
FIG. 7 shows an exemplary reduced preamble.

Referring to FIG. 7, an exemplary reduced acquisition preamble 700 associated with embodiments of the invention is depicted. Embodiments of the invention are configured to use the reduced acquisition preamble 700 for second (and subsequent) fragments of a data sector split into two or more fragments where the second (or any subsequent fragments) are to be written together with the first fragment. Further embodiments are configured to use the reduced acquisition preamble 700 for one or more fragments of at least one subsequent data sector, if the data sector and the at least one subsequent data sector are coherently written. Embodiments are configured to use the preamble 700 when operating in the first acquire mode (as described above), wherein the first acquire mode includes reducing the acquire length while still operating with enabled ZPS calculations and phase slew. (Phase slew includes initial phase alignment, and the duration of performing the phase slew is proportional to the phase error (which is limited by synthesizer drift).) The reduced acquisition preamble 700 (as depicted in FIG. 7) results from the shorter ZPS length and shorter acquire time of operating in the first acquire mode. The reduced acquisition preamble 700 allows for a maximum ⅛T phase error, where T=1/(data rate), which can also be described as ⅛ bit period maximum phase error or ⅛ sampling clock cycle maximum phase error). The reduced acquisition preamble 700 has a total length of 60T, which mostly includes ZPS, snap (e.g., sampling), and slew. The reduced acquisition preamble 700 results in a minimum savings of at least 24 bits, but more typically results in a savings of 48 bits. Additionally, the implementation of the reduced acquisition preamble 700 results in further system savings, such as a minimum SNR gain of 0.01 dB for 4K sector formatting (and minimum SNR gain of 0.006 dB for 512 byte sector formatting) with a typical SNR gain of 0.02 dB for 4K sector formatting (0.01 dB for 512 byte sector formatting). The reduced acquisition preamble 700 includes AC-coupling (ACC) settling with a length of 4 bits; analog-to-digital converter (ADC) startup with a length of 12 bits; zero phase start (ZPS) sampling and discrete Fourier transformation (DFT) calculations with a length of 12 bits; angle calculation and phase encode with a length of 8 bits; worst-case slew (for ⅛ T maximum phase error, where T=1/(data rate), which can also be described as ⅛ bit period maximum phase error or ⅛ sampling clock cycle maximum phase error) with a length of up to 8 bits; analog delay with a length of 4 bits; and ADC delay with a length of 12 bits.

Figure 8:
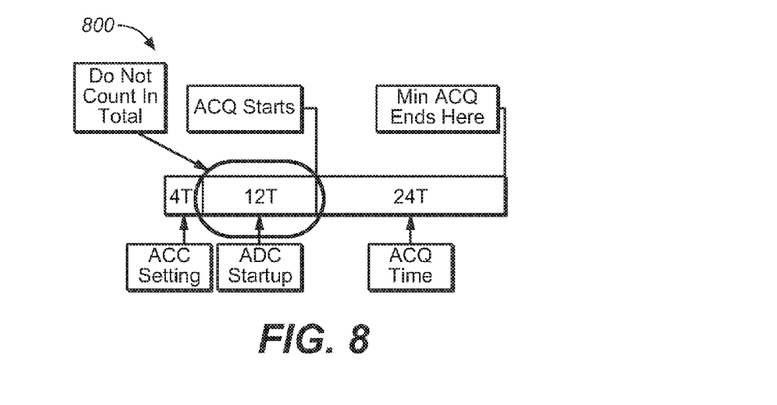
FIG. 8 shows a further exemplary reduced preamble.

Referring to FIG. 8, a further exemplary reduced acquisition preamble 800 associated with embodiments of the invention is depicted. Embodiments of the invention are configured to use the reduced acquisition preamble 800 for second (and subsequent) fragments of a data sector split into two or more fragments where the second (or any subsequent fragments) are to be written together with the first fragment. Further embodiments are configured to use the reduced acquisition preamble 800 for a first fragment (or subsequent fragments) of at least one subsequent data sector, if the data sector and the at least one data sector are coherently written. Embodiments are configured to use the reduced acquisition preamble 800 when operating in the second acquire mode (as described above), wherein the second acquire mode includes reduced acquire length, early acquire start, and slew disablement. The reduced acquisition preamble 800 (as depicted in FIG. 8) results from performing no ZPS and starting immediately with a smaller acquire interval and results from assuming all phase error is corrected during the acquire interval. The reduced acquisition preamble 800 has a total length of 28 bits, which mostly includes minimum acquire time. The reduced acquisition preamble 800 results in a minimum savings of at least 64 bits, but more typically results in a savings of 88 bits. Additionally, the implementation of the reduced acquisition preamble 800 results in further system savings, such as a minimum SNR gain of 0.02 dB for 4K sector formatting (and minimum SNR gain of 0.015 dB for 512 byte sector formatting) with a typical SNR gain of 0.03 dB for 4K sector formatting (0.02 dB for 512 byte sector formatting). The reduced acquisition preamble 800 includes AC-coupling (ACC) settling with a length of 4 bits; analog-to-digital converter (ADC) startup with a length of 12 bits; and acquire time with a length of 24 bits.

Figure 9:
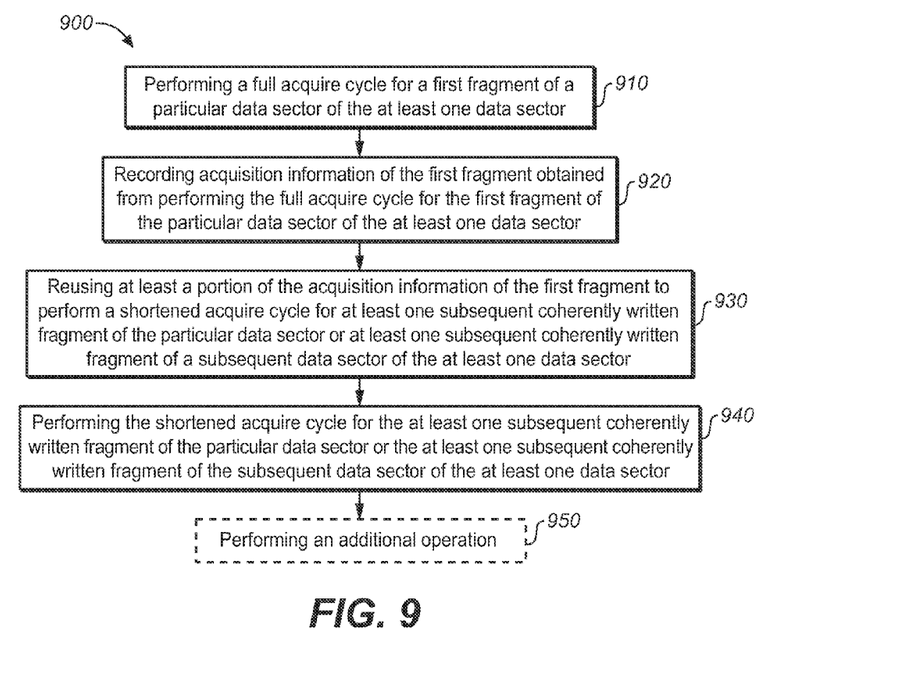
FIGS. 9-15 show embodied methods of the invention.

Referring to FIG. 9, an embodiment of the invention includes a method 900 for performing a shortened acquire cycle for at least one fragment of at least one data sector having coherently written fragments, the coherently written fragments being written during a single rotation of a storage medium. It is contemplated that embodiments of the method 900 can be performed by a control system 220; at least one component, circuit, or module of the control system 220, of a storage device 200, or of a computing device; software or firmware executed on a computing device (such as the control system 220, a controller, or a processor); other computing devices; other computer components; or on other software, firmware, or middleware of the system topology 100. The method 900 can include any or all of steps 910, 920, 930, 940, and/or 950, and it is contemplated that the method 900 can include additional steps as disclosed throughout, but not explicitly set forth in this paragraph. Further, it is fully contemplated that the steps of the method 900 can be performed concurrently or in a non-sequential order. Likewise, it is fully contemplated that the method 900 can be performed prior to, concurrently, subsequent to, or in combination with the performance of one or more steps of one or more other embodied methods or modes disclosed throughout, including but not limited to steps of methods 1000, 1100, 1200, 1300, and/or 1400.

Embodiments of the method 900 include a step 910, wherein the step 910 comprises performing a full acquire cycle for a first fragment of a particular data sector of the at least one data sector. Embodiments of the method 900 also include a step 920, wherein the step 920 comprises recording acquisition information of the first fragment obtained from performing the full acquire cycle for the first fragment of the particular data sector of the at least one data sector. Embodiments of the method 900 further include a step 930, wherein the step 930 comprises reusing at least a portion of the acquisition information of the first fragment to perform a shortened acquire cycle for at least one subsequent coherently written fragment of the particular data sector or at least one subsequent coherently written fragment of a subsequent data sector of the at least one data sector. Embodiments of the method 900 include a step 940, wherein the step 940 comprises performing the shortened acquire cycle for the at least one subsequent coherently written fragment of the particular data sector or the at least one subsequent coherently written fragment of the subsequent data sector of the at least one data sector. In some embodiments, the method 900 includes a step 950, wherein the step 950 includes performing an additional operation. For example, in some embodiments the step 950 comprises performing one or more debug or error recovery operations.

Figure 10:
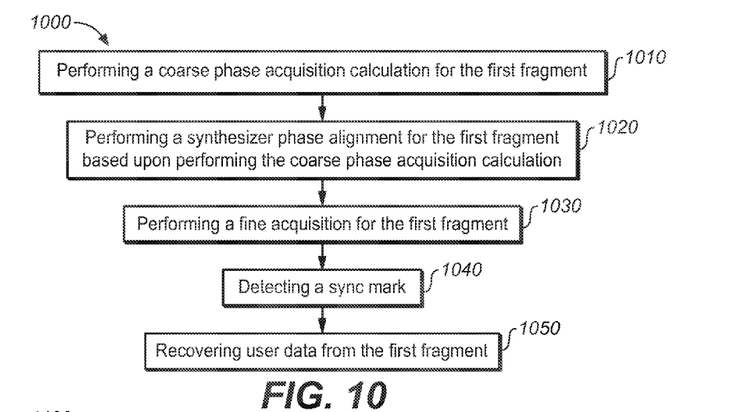

Referring to FIG. 10, an embodiment of the invention includes a method 1000 for performing a full acquire cycle for a first fragment of a particular data sector. It is contemplated that embodiments of the method 1000 can be performed by a control system 220; at least one component, circuit, or module of the control system 220, of a storage device 200, or of a computing device; software or firmware executed on a computing device (such as the control system 220, a controller, or a processor); other computing devices; other computer components; or on other software, firmware, or middleware of the system topology 100. The method 1000 can include any or all of steps 1010, 1020, 1030, 1040, and/or 1050, and it is contemplated that the method 1000 can include additional steps as disclosed throughout, but not explicitly set forth in this paragraph. Further, it is fully contemplated that the steps of the method 1000 can be performed concurrently or in a non-sequential order. Likewise, it is fully contemplated that the method 1000 can be performed prior to, concurrently, subsequent to, or in combination with the performance of one or more steps of one or more other embodied methods or modes disclosed throughout.

Embodiments of the method 1000 include a step 1010, wherein the step 1010 comprises performing a coarse phase acquisition calculation for the first fragment. Embodiments of the method 1000 also include a step 1020, wherein the step 1020 comprises performing a synthesizer phase alignment for the first fragment based upon performing the coarse phase acquisition calculation. Performing the synthesizer phase alignment can include incremental change to the sampling phase and is generally subject to a maximum rate of sampling phase change. Embodiments of the method 1000 further include a step 1030, wherein the step 1030 comprises performing a fine acquisition for the first fragment. Embodiments of the method 1000 include a step 1040, wherein the step 1040 comprises detecting a sync mark. Embodiments of the method 1000 include a step 1050, wherein the step 1050 includes recovering user data from the first fragment.

Figure 11:
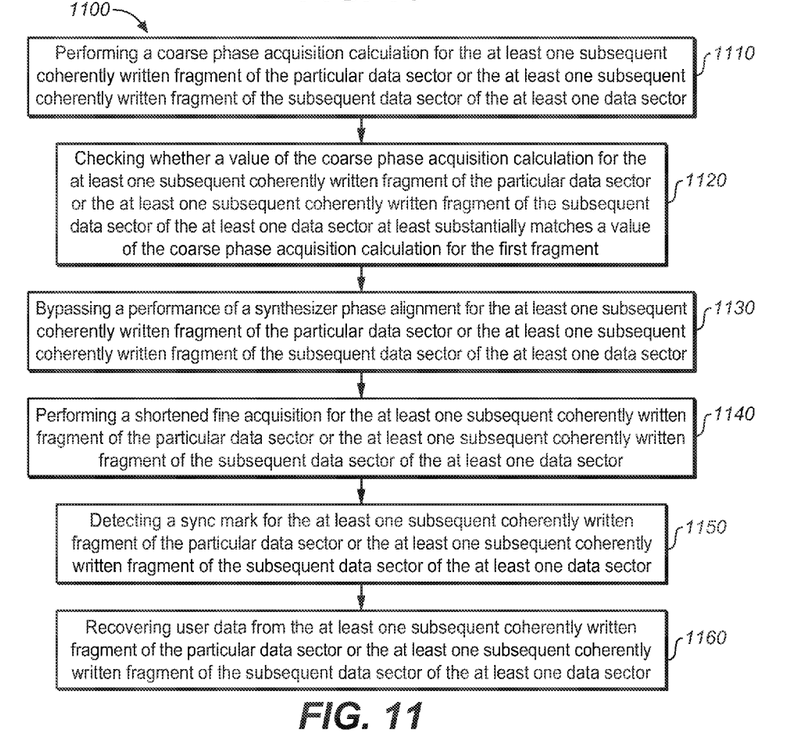

Referring to FIG. 11, an embodiment of the invention includes a method 1100 for performing a shortened acquire cycle for at least one subsequent coherently written fragment of the particular data sector or the at least one subsequent coherently written fragment of the subsequent data sector of the at least one data sector. It is contemplated that embodiments of the method 1100 can be performed by a control system 220; at least one component, circuit, or module of the control system 220, of a storage device 200, or of a computing device; software or firmware executed on a computing device (such as the control system 220, a controller, or a processor); other computing devices; other computer components; or on other software, firmware, or middleware of the system topology 100. The method 1100 can include any or all of steps 1110, 1120, 1130, 1140, 1150, and/or 1160, and it is contemplated that the method 1100 can include additional steps as disclosed throughout, but not explicitly set forth in this paragraph. Further, it is fully contemplated that the steps of the method 1100 can be performed concurrently or in a non-sequential order. Likewise, it is fully contemplated that the method 1100 can be performed prior to, concurrently, subsequent to, or in combination with the performance of one or more steps of one or more other embodied methods or modes disclosed throughout.

Embodiments of the method 1100 include a step 1110, wherein the step 1110 comprises performing a coarse phase acquisition calculation for the at least one subsequent coherently written fragment of the particular data sector or the at least one subsequent coherently written fragment of the subsequent data sector of the at least one data sector. Embodiments of the method 1100 also include a step 1120, wherein the step 1120 comprises checking whether a value of the coarse phase acquisition calculation for the at least one subsequent coherently written fragment of the particular data sector or the at least one subsequent coherently written fragment of the subsequent data sector of the at least one data sector at least substantially matches a value of the coarse phase acquisition calculation for the first fragment. Embodiments of the method 1100 further include a step 1130, wherein the step 1130 comprises bypassing a performance of a synthesizer phase alignment for the at least one subsequent coherently written fragment of the particular data sector or the at least one subsequent coherently written fragment of the subsequent data sector of the at least one data sector. Performance of the synthesizer phase alignment can include incremental change to the sampling phase and is generally subject to a maximum rate of sampling phase change. Embodiments of the method 1100 include a step 1140, wherein the step 1140 comprises performing a shortened fine acquisition for the at least one subsequent coherently written fragment of the particular data sector or the at least one subsequent coherently written fragment of the subsequent data sector of the at least one data sector. Embodiments of the method 1100 include a step 1150, wherein the step 1150 includes detecting a sync mark for the at least one subsequent coherently written fragment of the particular data sector or the at least one subsequent coherently written fragment of the subsequent data sector of the at least one data sector. Additionally, embodiments of the method 1100 include a step 1160, wherein the step 1160 includes recovering user data from the at least one subsequent coherently written fragment of the particular data sector or the at least one subsequent coherently written fragment of the subsequent data sector of the at least one data sector.

Figure 12:
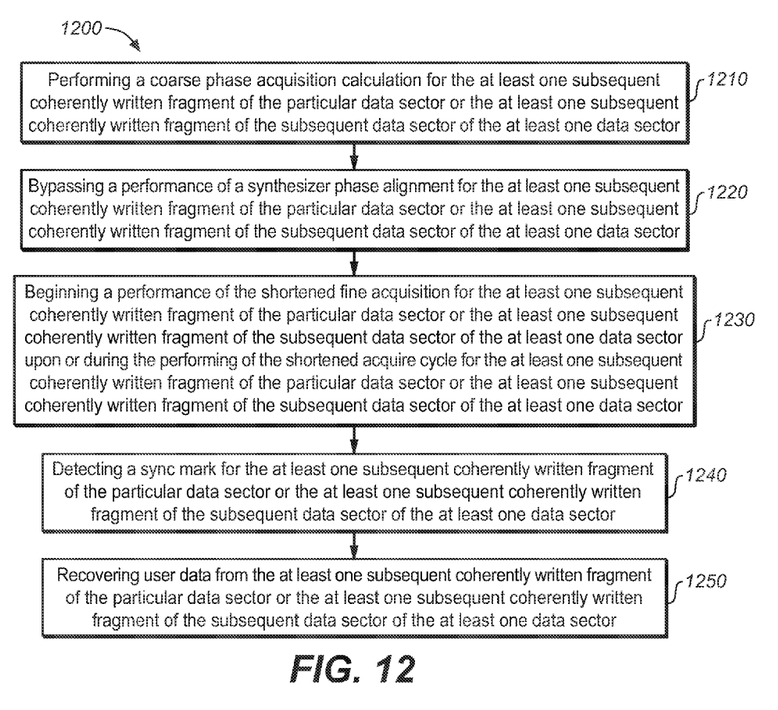

Referring to FIG. 12, an embodiment of the invention includes a method 1200 for performing a shortened acquire cycle for at least one subsequent coherently written fragment of the particular data sector or the at least one subsequent coherently written fragment of the subsequent data sector of the at least one data sector. It is contemplated that embodiments of the method 1200 can be performed by a control system 220; at least one component, circuit, or module of the control system 220, of a storage device 200, or of a computing device; software or firmware executed on a computing device (such as the control system 220, a controller, or a processor); other computing devices; other computer components; or on other software, firmware, or middleware of the system topology 100. The method 1200 can include any or all of steps 1210, 1220, 1230, 1240, and/or 1250, and it is contemplated that the method 1200 can include additional steps as disclosed throughout, but not explicitly set forth in this paragraph. Further, it is fully contemplated that the steps of the method 1200 can be performed concurrently or in a non-sequential order. Likewise, it is fully contemplated that the method 1200 can be performed prior to, concurrently, subsequent to, or in combination with the performance of one or more steps of one or more other embodied methods or modes disclosed throughout.

Embodiments of the method 1200 include a step 1210, wherein the step 1210 comprises performing a coarse phase acquisition calculation for the at least one subsequent coherently written fragment of the particular data sector or the at least one subsequent coherently written fragment of the subsequent data sector of the at least one data sector. Embodiments of the method 1200 also include a step 1220, wherein the step 1220 comprises bypassing a performance of a synthesizer phase alignment for the at least one subsequent coherently written fragment of the particular data sector or the at least one subsequent coherently written fragment of the subsequent data sector of the at least one data sector. Performance of the synthesizer phase alignment can include incremental change to the sampling phase and is generally subject to a maximum rate of sampling phase change. Embodiments of the method 1200 further include a step 1230, wherein the step 1230 comprises beginning a performance of the shortened fine acquisition for the at least one subsequent coherently written fragment of the particular data sector or the at least one subsequent coherently written fragment of the subsequent data sector of the at least one data sector upon or during the performing of the shortened acquire cycle for the at least one subsequent coherently written fragment of the particular data sector or the at least one subsequent coherently written fragment of the subsequent data sector of the at least one data sector. Embodiments of the method 1200 include a step 1240, wherein the step 1240 comprises detecting a sync mark for the at least one subsequent coherently written fragment of the particular data sector or the at least one subsequent coherently written fragment of the subsequent data sector of the at least one data sector. Embodiments of the method 1200 include a step 1250, wherein the step 1250 includes recovering user data from the at least one subsequent coherently written fragment of the particular data sector or the at least one subsequent coherently written fragment of the subsequent data sector of the at least one data sector.

Figure 13:
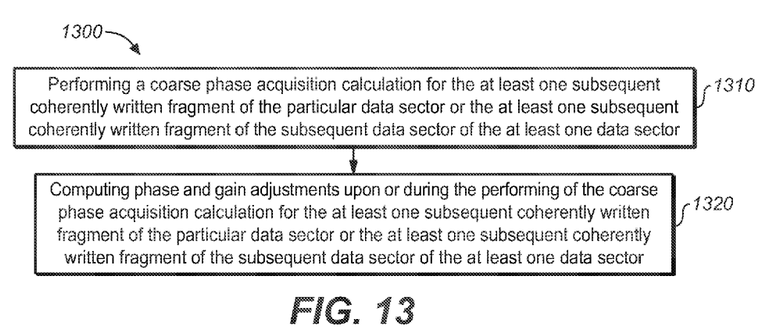

Referring to FIG. 13, an embodiment of the invention includes a method 1300 for performing a shortened acquire cycle for at least one subsequent coherently written fragment of the particular data sector or the at least one subsequent coherently written fragment of the subsequent data sector of the at least one data sector. It is contemplated that embodiments of the method 1300 can be performed by a control system 220; at least one component, circuit, or module of the control system 220, of a storage device 200, or of a computing device; software or firmware executed on a computing device (such as the control system 220, a controller, or a processor); other computing devices; other computer components; or on other software, firmware, or middleware of the system topology 100. The method 1200 can include any or all of steps 1310 and/or 1320, and it is contemplated that the method 1300 can include additional steps as disclosed throughout, but not explicitly set forth in this paragraph. Further, it is fully contemplated that the steps of the method 1300 can be performed concurrently or in a non-sequential order. Likewise, it is fully contemplated that the method 1300 can be performed prior to, concurrently, subsequent to, or in combination with the performance of one or more steps of one or more other embodied methods or modes disclosed throughout.

Embodiments of the method 1300 include a step 1310, wherein the step 1310 comprises performing a coarse phase acquisition calculation for the at least one subsequent coherently written fragment of the particular data sector or the at least one subsequent coherently written fragment of the subsequent data sector of the at least one data sector. Embodiments of the method 1300 also include a step 1320, wherein the step 1320 comprises computing phase and gain adjustments upon or during the performing of the coarse phase acquisition calculation for the at least one subsequent coherently written fragment of the particular data sector or the at least one subsequent coherently written fragment of the subsequent data sector of the at least one data sector. Additionally, some embodiments of the method 1300 further include a step which comprises slewing the phase for the at least one subsequent fragment until the coarse phase acquisition calculation for the at least one subsequent fragment is greater than a threshold value. Furthermore, some embodiments of the method 1300 further include a step which comprises applying the computed phase and gain adjustments if the coarse phase acquisition calculation for the at least one subsequent fragment is less than or equal to a threshold value.

Figure 14:
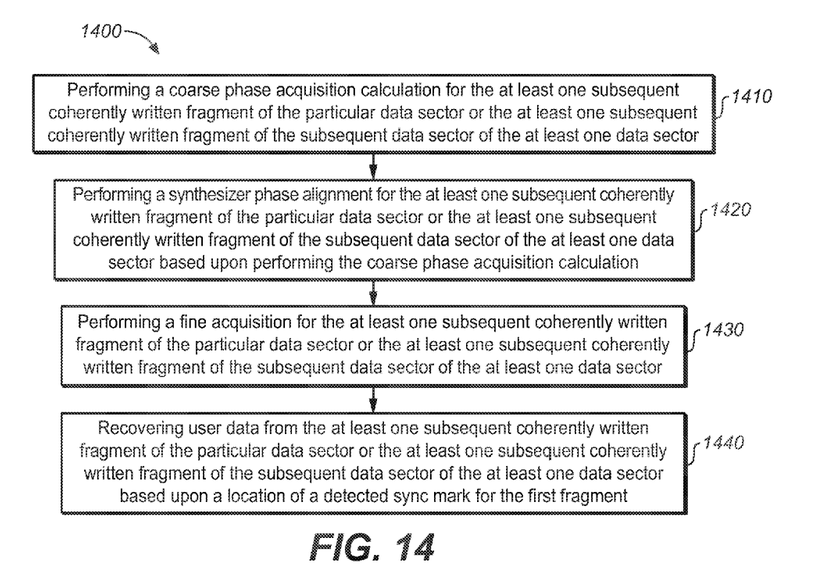

Referring to FIG. 14, an embodiment of the invention includes a method 1400 for performing one or more debug or error recovery operations. It is contemplated that embodiments of the method 1400 can be performed by a control system 220; at least one component, circuit, or module of the control system 220, of a storage device 200, or of a computing device; software or firmware executed on a computing device (such as the control system 220, a controller, or a processor); other computing devices; other computer components; or on other software, firmware, or middleware of the system topology 100. The method 1400 can include any or all of steps 1410, 1420, 1430, and/or 1440, and it is contemplated that the method 1400 can include additional steps as disclosed throughout, but not explicitly set forth in this paragraph. Further, it is fully contemplated that the steps of the method 1400 can be performed concurrently or in a non-sequential order. Likewise, it is fully contemplated that the method 1400 can be performed prior to, concurrently, subsequent to, or in combination with the performance of one or more steps of one or more other embodied methods or modes disclosed throughout.

Embodiments of the method 1400 include a step 1410, wherein the step 1410 comprises performing a coarse phase acquisition calculation for the at least one subsequent coherently written fragment of the particular data sector or the at least one subsequent coherently written fragment of the subsequent data sector of the at least one data sector. Embodiments of the method 1400 also include a step 1420, wherein the step 1420 comprises performing a synthesizer phase alignment for the at least one subsequent coherently written fragment of the particular data sector or the at least one subsequent coherently written fragment of the subsequent data sector of the at least one data sector based upon performing the coarse phase acquisition calculation. Performing the synthesizer phase alignment can include incremental change to the sampling phase and is generally subject to a maximum rate of sampling phase change. Embodiments of the method 1400 further include a step 1430, wherein the step 1430 comprises performing a fine acquisition for the at least one subsequent coherently written fragment of the particular data sector or the at least one subsequent coherently written fragment of the subsequent data sector of the at least one data sector. Embodiments of the method 1400 include a step 1440, wherein the step 1440 comprises recovering user data from the at least one subsequent coherently written fragment of the particular data sector or the at least one subsequent coherently written fragment of the subsequent data sector of the at least one data sector based upon a location of a detected sync mark for the first fragment.

Figure 15:
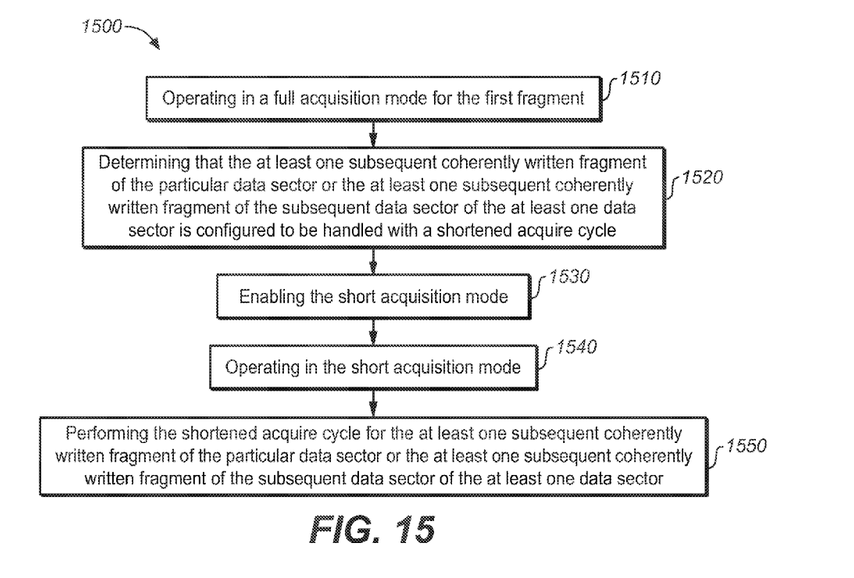

Referring to FIG. 15, an embodiment of the invention includes a method 1500 for operating in a short acquisition mode to handle coherently written fragments of at least one data sector, the coherently written fragments of the at least one data sector including a first fragment and at least one subsequent fragment. It is contemplated that embodiments of the method 1500 can be performed by a control system 220; at least one component, circuit, or module of the control system 220, of a storage device 200, or of a computing device; software or firmware executed on a computing device (such as the control system 220, a controller, or a processor); other computing devices; other computer components; or on other software, firmware, or middleware of the system topology 100. The method 1500 can include any or all of steps 1510, 1520, 1530, 1540 and/or 1550, and it is contemplated that the method 1500 can include additional steps as disclosed throughout, but not explicitly set forth in this paragraph. Further, it is fully contemplated that the steps of the method 1500 can be performed concurrently or in a non-sequential order. Likewise, it is fully contemplated that the method 1500 can be performed prior to, concurrently, subsequent to, or in combination with the performance of one or more steps of one or more other embodied methods or modes disclosed throughout.

Embodiments of the method 1500 include a step 1510, wherein the step 1510 comprises operating in a full acquisition mode for the first fragment. Embodiments of the method 1500 also include a step 1520, wherein the step 1520 comprises determining that the at least one subsequent fragment of the at least one data sector is configured to be handled with a shortened acquire cycle. Embodiments of the method 1500 further include a step 1530, wherein the step 1530 comprises enabling the short acquisition mode. Embodiments of the method 1500 include a step 1540, wherein the step 1540 comprises operating in the short acquisition mode. Additionally, embodiments of the method 1500 include a step 1550, wherein the step 1550 comprises performing the shortened acquire cycle for the at least one subsequent fragment of the at least one data sector.

It is believed that embodiments of the present invention and many of its attendant advantages will be understood by the foregoing description, and it will be apparent that various changes can be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for performing a shortened acquire cycle for at least one fragment of at least one data sector having coherently written fragments, the method comprising:
   performing a full acquire cycle for a first fragment of a particular data sector of the at least one data sector;
   recording acquisition information of the first fragment obtained from performing the full acquire cycle for the first fragment of the particular data sector of the at least one data sector;
   reusing at least a portion of the acquisition information of the first fragment to perform a shortened acquire cycle for at least one subsequent coherently written fragment of the particular data sector or at least one subsequent coherently written fragment of a subsequent data sector of the at least one data sector; and
   performing the shortened acquire cycle for the at least one subsequent coherently written fragment of the particular data sector or the at least one subsequent coherently written fragment of the subsequent data sector of the at least one data sector.

2. The method of claim 1, wherein performing the shortened acquire cycle for the at least one subsequent coherently written fragment of the particular data sector or the at least one subsequent coherently written fragment of the subsequent data sector of the at least one data sector reduces a required preamble length for one or more of the at least one subsequent coherently written fragment of the particular data sector or the at least one subsequent coherently written fragment of the subsequent data sector of the at least one data sector to a length shorter than a length of a preamble of the first fragment.

3. The method of claim 1, wherein the first fragment and one or more of the at least one subsequent coherently written fragment of the particular data sector or the at least one subsequent coherently written fragment of the subsequent data sector of the at least one data sector are coherently written fragments such that write phase alignment remains substantially the same between fragments of the at least one data sector.

4. The method of claim 1, wherein performing a full acquire cycle for a first fragment of the particular data sector, further comprises:
   performing a coarse phase acquisition calculation for the first fragment;

performing a synthesizer phase alignment for the first fragment based upon performing the coarse phase acquisition calculation;
performing a fine acquisition for the first fragment;
detecting a sync mark for the first fragment; and
recovering user data from the first fragment.

5. The method of claim 4, wherein performing the shortened acquire cycle for the at least one subsequent coherently written fragment of the particular data sector or the at least one subsequent coherently written fragment of the subsequent data sector of the at least one data sector, further comprises:
performing a coarse phase acquisition calculation for the at least one subsequent coherently written fragment of the particular data sector or the at least one subsequent coherently written fragment of the subsequent data sector of the at least one data sector;
bypassing a performance of a synthesizer phase alignment for the at least one subsequent coherently written fragment of the particular data sector or the at least one subsequent coherently written fragment of the subsequent data sector of the at least one data sector; and
performing a shortened fine acquisition for the at least one subsequent coherently written fragment of the particular data sector or the at least one subsequent coherently written fragment of the subsequent data sector of the at least one data sector.

6. The method of claim 5, wherein a duration for performing the shortened fine acquisition for the at least one subsequent coherently written fragment of the particular data sector or the at least one subsequent coherently written fragment of the subsequent data sector of the at least one data sector is less than a duration for performing the fine acquisition for the first fragment.

7. The method of claim 5, wherein performing the shortened acquire cycle for the at least one subsequent coherently written fragment of the particular data sector or the at least one subsequent coherently written fragment of the subsequent data sector of the at least one data sector, further comprises:
checking whether a value of the coarse phase acquisition calculation for the at least one subsequent coherently written fragment of the particular data sector or the at least one subsequent coherently written fragment of the subsequent data sector of the at least one data sector at least substantially matches a value of the coarse phase acquisition calculation for the first fragment.

8. The method of claim 4, wherein performing the shortened acquire cycle for the at least one subsequent coherently written fragment of the particular data sector or the at least one subsequent coherently written fragment of the subsequent data sector of the at least one data sector, further comprises:
performing a coarse phase acquisition calculation for the at least one subsequent coherently written fragment of the particular data sector or the at least one subsequent coherently written fragment of the subsequent data sector of the at least one data sector;
bypassing a performance of a synthesizer phase alignment for the at least one subsequent coherently written fragment of the particular data sector or the at least one subsequent coherently written fragment of the subsequent data sector of the at least one data sector; and
beginning a performance of the shortened fine acquisition for the at least one subsequent coherently written fragment of the particular data sector or the at least one subsequent coherently written fragment of the subsequent data sector of the at least one data sector upon or during the performing of the shortened acquire cycle for the at least one subsequent coherently written fragment of the particular data sector or the at least one subsequent coherently written fragment of the subsequent data sector of the at least one data sector.

9. The method of claim 8, wherein beginning the performance of the shortened fine acquisition for the at least one subsequent coherently written fragment of the particular data sector or the at least one subsequent coherently written fragment of the subsequent data sector of the at least one data sector occurs concurrently with performing the coarse phase acquisition calculation for the at least one subsequent coherently written fragment of the particular data sector or the at least one subsequent coherently written fragment of the subsequent data sector of the at least one data sector.

10. The method of claim 8, wherein performing the shortened acquire cycle for the at least one subsequent coherently written fragment of the particular data sector or the at least one subsequent coherently written fragment of the subsequent data sector of the at least one data sector, further comprises:
detecting a sync mark for the at least one subsequent coherently written fragment of the particular data sector or the at least one subsequent coherently written fragment of the subsequent data sector of the at least one data sector; and
recovering user data from the at least one subsequent coherently written fragment of the particular data sector or the at least one subsequent coherently written fragment of the subsequent data sector of the at least one data sector.

11. The method of claim 4, wherein performing the shortened acquire cycle for the at least one subsequent coherently written fragment of the particular data sector or the at least one subsequent coherently written fragment of the subsequent data sector of the at least one data sector, further comprises:
performing a coarse phase acquisition calculation for the at least one subsequent coherently written fragment of the particular data sector or the at least one subsequent coherently written fragment of the subsequent data sector of the at least one data sector; and
computing phase and gain adjustments upon or during the performing of the coarse phase acquisition calculation for the at least one subsequent coherently written fragment of the particular data sector or the at least one subsequent coherently written fragment of the subsequent data sector of the at least one data sector.

12. The method of claim 11, wherein performing the shortened acquire cycle for the at least one subsequent coherently written fragment of the particular data sector or the at least one subsequent coherently written fragment of the subsequent data sector of the at least one data sector, further comprises:
slewing the phase for the at least one subsequent coherently written fragment of the particular data sector or the at least one subsequent coherently written fragment of the subsequent data sector of the at least one data sector until the coarse phase acquisition calculation for the at least one subsequent coherently written fragment of the particular data sector or the at least one subsequent coherently written fragment of the subsequent data sector of the at least one data sector is greater than a threshold value.

13. The method of claim 11, wherein performing the shortened acquire cycle for the at least one subsequent coherently written fragment of the particular data sector or the at least one subsequent coherently written fragment of the subsequent data sector of the at least one data sector, further comprises:

applying the computed phase and gain adjustments if the coarse phase acquisition calculation for the at least one subsequent coherently written fragment of the particular data sector or the at least one subsequent coherently written fragment of the subsequent data sector of the at least one data sector is less than or equal to a threshold value.

14. The method of claim 1, wherein performing the shortened acquire cycle for the at least one subsequent coherently written fragment of the particular data sector or the at least one subsequent coherently written fragment of the subsequent data sector of the at least one data sector, further comprises:

bypassing a performance of a synthesizer phase alignment for the at least one subsequent coherently written fragment of the particular data sector or the at least one subsequent coherently written fragment of the subsequent data sector of the at least one data sector.

15. The method of claim 1, further comprising:
performing one or more debug or error recovery operations.

16. The method of claim 15, wherein performing the one or more debug or error recovery operations for the at least one subsequent coherently written fragment of the particular data sector or the at least one subsequent coherently written fragment of the subsequent data sector of the at least one data sector further comprises:

performing a coarse phase acquisition calculation for the at least one subsequent coherently written fragment of the particular data sector or the at least one subsequent coherently written fragment of the subsequent data sector of the at least one data sector;

performing a synthesizer phase alignment for the at least one subsequent coherently written fragment of the particular data sector or the at least one subsequent coherently written fragment of the subsequent data sector of the at least one data sector based upon performing the coarse phase acquisition calculation;

performing a fine acquisition for the at least one subsequent coherently written fragment of the particular data sector or the at least one subsequent coherently written fragment of the subsequent data sector of the at least one data sector; and recovering user data from the at least one subsequent coherently written fragment of the particular data sector or the at least one subsequent coherently written fragment of the subsequent data sector of the at least one data sector based upon a location of a detected sync mark for the first fragment.

17. The method of claim 15, wherein performing the one or more debug or error recovery operations for the at least one subsequent coherently written fragment of the particular data sector or the at least one subsequent coherently written fragment of the subsequent data sector of the at least one data sector further comprises:

performing a coarse phase acquisition calculation for the at least one subsequent coherently written fragment of the particular data sector or the at least one subsequent coherently written fragment of the subsequent data sector of the at least one data sector;

performing a synthesizer phase alignment for the at least one subsequent coherently written fragment of the particular data sector or the at least one subsequent coherently written fragment of the subsequent data sector of the at least one data sector based upon performing the coarse phase acquisition calculation;

bypassing a performance of a fine acquisition for the at least one subsequent coherently written fragment of the particular data sector or the at least one subsequent coherently written fragment of the subsequent data sector of the at least one data sector;

bypassing a performance of detecting a sync mark for the at least one subsequent coherently written fragment of the particular data sector or the at least one subsequent coherently written fragment of the subsequent data sector of the at least one data sector; and recovering user data from the at least one subsequent coherently written fragment of the particular data sector or the at least one subsequent coherently written fragment of the subsequent data sector of the at least one data sector.

18. The method of claim 15, wherein performing the one or more debug or error recovery operations for the at least one subsequent coherently written fragment of the particular data sector or the at least one subsequent coherently written fragment of the subsequent data sector of the at least one data sector further comprises:

recording phase values on a per-fragment basis.

19. The method of claim 15, wherein performing the one or more debug or error recovery operations for the at least one subsequent coherently written fragment of the particular data sector or the at least one subsequent coherently written fragment of the subsequent data sector of the at least one data sector further comprises:

reporting an error.

20. The method of claim 15, wherein performing the one or more debug or error recovery operations for the at least one subsequent coherently written fragment of the particular data sector or the at least one subsequent coherently written fragment of the subsequent data sector of the at least one data sector further comprises:

altering the sampling phase in anticipation of the at least one subsequent coherently written fragment of the particular data sector or the at least one subsequent coherently written fragment of the subsequent data sector of the at least one data sector.

21. The method of claim 1, wherein performing the shortened acquire cycle for the at least one subsequent coherently written fragment of the particular data sector or the at least one subsequent coherently written fragment of the subsequent data sector of the at least one data sector comprises:

performing the shortened acquire cycle for the at least one subsequent coherently written fragment of the subsequent data sector of the at least one data sector.

22. The method of claim 1, wherein performing the shortened acquire cycle for the at least one subsequent coherently written fragment of the particular data sector or the at least one subsequent coherently written fragment of the subsequent data sector of the at least one data sector, further comprises:

detecting a sync mark for each of the at least one subsequent coherently written fragment of the particular data sector or the at least one subsequent coherently written fragment of the subsequent data sector of the at least one data sector upon performing the full acquire cycle for the first fragment of the particular data sector of the at least one data sector, wherein none of the at least one subsequent coherently written fragment of the particular data sector or the at least one subsequent coherently written fragment of the subsequent data sector of the at least one data sector has a preamble.

23. The method of claim 1, wherein performing a full acquire cycle for a first fragment of the particular data sector further comprises:
   performing a coarse phase acquisition calculation for the first fragment;
   performing a synthesizer phase alignment for the first fragment based upon performing the coarse phase acquisition calculation;
   bypassing a performance of a fine acquisition for the first fragment;
   bypassing a performance of detecting a sync mark for the first fragment; and
   recovering user data from the first fragment.

24. The method of claim 1, wherein the coherently written fragments are written during a single rotation of a storage medium.

25. A method for operating in a short acquisition mode to handle coherently written fragments of at least one data sector, the coherently written fragments of the at least one data sector including a first fragment and at least one subsequent coherently written fragment, the method comprising:
   operating in a full acquisition mode for the first fragment, wherein operating in the full acquisition mode for the first fragment comprises:
      performing a full acquire cycle for the first fragment of a particular data sector of the at least one data sector; and
      recording acquisition information of the first fragment obtained from performing the full acquire cycle for the first fragment of the particular data sector of the at least one data sector;
   determining that the at least one subsequent coherently written fragment of the at least one data sector is configured to be handled with a shortened acquire cycle;
   enabling the short acquisition mode; and
   operating in the short acquisition mode, wherein operating in the short acquisition mode comprises:
      reusing at least a portion of the acquisition information of the first fragment to perform the shortened acquire cycle for at least one subsequent coherently written fragment of the particular data sector or at least one subsequent coherently written fragment of a subsequent data sector of the at least one data sector; and
      performing the shortened acquire cycle for the at least one subsequent coherently written fragment of the particular data sector or the at least one subsequent coherently written fragment of the subsequent data sector of the at least one data sector.

26. A control system of a storage medium for performing a shortened acquire cycle for at least one fragment of at least one data sector having coherently written fragments, comprising:
   a circuit, wherein the circuit is configured for:
      performing a full acquire cycle for a first fragment of a particular data sector of the at least one data sector;
      recording acquisition information of the first fragment obtained from performing the full acquire cycle for the first fragment of the particular data sector of the at least one data sector;
      reusing at least a portion of the acquisition information of the first fragment to perform a shortened acquire cycle for at least one subsequent coherently written fragment of the particular data sector or at least one subsequent coherently written fragment of a subsequent data sector of the at least one data sector; and
      performing the shortened acquire cycle for the at least one subsequent coherently written fragment of the particular data sector or the at least one subsequent coherently written fragment of the subsequent data sector of the at least one data sector.

27. The control system of claim 26, wherein the circuit comprises a digital phase-locked loop.

* * * * *